US008838492B1

(12) United States Patent
Baker

(10) Patent No.: US 8,838,492 B1
(45) Date of Patent: Sep. 16, 2014

(54) METHOD AND APPARATUS FOR GENERATING A FINANCIAL AID APPLICATION

(75) Inventor: Tristan C. Baker, San Diego, CA (US)

(73) Assignee: Intuit Inc., Mountain View, CA (US)

( * ) Notice: Subject to any disclaimer, the term of this patent is extended or adjusted under 35 U.S.C. 154(b) by 1153 days.

(21) Appl. No.: 11/528,302

(22) Filed: Sep. 27, 2006

(51) Int. Cl.
*G06Q 40/00* (2012.01)
*G06Q 40/02* (2012.01)

(52) U.S. Cl.
CPC ............ *G06Q 40/025* (2013.01); *G06Q 40/123* (2013.01)
USPC .............................. 705/36 T; 705/38; 705/35

(58) Field of Classification Search
CPC ........................... G06Q 40/025; G06Q 40/123
USPC ............................................ 705/36 T, 38, 35
See application file for complete search history.

(56) References Cited

U.S. PATENT DOCUMENTS 6,473,741 B1 * 10/2002 Baker .............................. 705/31
6,651,217 B1 * 11/2003 Kennedy et al. .............. 715/224
2001/0011250 A1 * 8/2001 Paltenghe et al. ............... 705/41
2006/0265258 A1 * 11/2006 Powell et al. ..................... 705/7
2006/0282354 A1 * 12/2006 Varghese ........................ 705/32
2008/0040779 A1 * 2/2008 Budzichowski .................. 726/5
2008/0071673 A1 * 3/2008 Howard et al. ................. 705/38

OTHER PUBLICATIONS

FAFSA on the Web—U.S. Department of Education, archived at WayBackMachine on Jan. 1, 2005.*
Form 1040EZ: Income Tax Return for Single and Joint Filers With No Dependents, 2006.*
Form 2848: Power of Attorney and Declaraction of Representative, 2004.*
Form 1040A: US Individual Income Tax Return, 2006.*
Form 4506: Request for Copy of Tax Return, 2006.*

* cited by examiner

*Primary Examiner* — Thomas M Hammond, III
*Assistant Examiner* — John Scarito
(74) *Attorney, Agent, or Firm* — Park, Vaughan, Fleming & Dowler LLP

(57) ABSTRACT

A system that generates a financial aid application. During operation, the system determines whether a person has authorized access to a tax return belonging to the person for purposes of generating a financial aid application. If so, the system retrieves the tax return for the person, extracts information about the person from the tax return, and uses the extracted information to populate one or more fields in the financial aid application.

28 Claims, 8 Drawing Sheets

METHOD AND APPARATUS FOR GENERATING A FINANCIAL AID APPLICATION

RELATED APPLICATION

This application is related to a U.S. patent application, entitled "Financial Aid Information Aggregator," by inventors Kenneth R. Howard, William W. Huckabee, Stephen H. Wright, Hiep Nguyen, Sara D. Mattice, Jennifer L. Reeves, James G. Johnson, and Albert F. Baines, having Ser. No. 11/508,026 and a filing date of 21 Aug. 2006. The above-listed application is hereby incorporated by reference.

BACKGROUND

The present invention relates to techniques for generating financial aid applications.

A typical financial aid application includes information about the financial state of a student, which facilitates determining whether the student qualifies for financial aid and the amount of financial aid that the student qualifies for. Note that the information about the student's financial state can include, but is not limited to, information related to bank accounts and investment accounts, salaries, and expenses (e.g., loans or credit card payments).

One such financial aid application is the Free Application for Federal Student Aid (FAFSA) provided by the United States Department of Education. The Department of Education provides a web-based tool for generating and submitting a FAFSA application online. To use this tool, a student or a parent/guardian gathers the requested financial information and fills out an online financial aid application. For a financially-independent student (i.e., a student who cannot be claimed as a dependent of another person), a substantial portion of the information requested by the financial aid application is the same information that is found in the student's tax return. For a student who is financially-dependent, a substantial portion of the information can similarly be found in a tax return for a parent or a guardian of the student.

Unfortunately, the information about the financial state of the student (and the parent or guardian) must be manually entered twice: once when preparing a tax return, and once when preparing a FAFSA application.

SUMMARY

One embodiment of the present invention provides a system that generates a financial aid application. During operation, the system determines whether a person has authorized access to a tax return belonging to the person for purposes of generating a financial aid application. If so, the system retrieves the tax return for the person, extracts information about the person from the tax return, and uses the extracted information to populate one or more fields in the financial aid application.

In a variation on this embodiment, the financial aid application is generated for the person.

In a variation on this embodiment, while determining whether the person has authorized access to the tax return, the system determines whether a field in the tax return indicates that the person has authorized access to the tax return for purposes of generating a financial aid application.

In a variation on this embodiment, while determining whether the person has authorized access to the tax return, the system queries a trusted source to determine whether the person has authorized access to the tax return for purposes of generating a financial aid application.

In a further variation, the trusted source can include: a government tax agency; a financial aid agency; a third party trusted source; and any other entity which is recognized as a trusted source by the financial aid agency associated with the financial aid application.

In a variation on this embodiment, if the person is a dependent of a second person, the system determines an identifier for the second person from the tax return of the person. Next, the system determines whether the second person has authorized access to a tax return belonging to the second person for purposes of generating a financial aid application for the person. If so, the system uses the identifier to retrieve the tax return for the second person, and determines whether the tax return for the second person indicates that the person is a dependent of the second person. If so, the system extracts information about the second person from the tax return, and uses the extracted information to populate one or more fields in the financial aid application.

In a variation on this embodiment, if a third person is a dependent of the person, the system determines an identifier for the third person from the tax return for the person. Next, the system determines whether the third person has authorized access to a tax return belonging to the third person for purposes of generating a financial aid application for the third person. If so, the system uses the identifier to retrieve the tax return for the third person, and determines whether the tax return for the third person indicates that the third person is a dependent of the person. If so, the system extracts information about the third person from the tax return, and uses the extracted information to populate one or more fields in the financial aid application.

In a further variation, if a fourth person claims the third person as a dependent, the system determines an identifier for the fourth person from the tax return for the third person. Next, the system determines whether the fourth person has authorized access to a tax return belonging to the fourth person for purposes of generating a financial aid application for the third person. If so, the system uses the identifier to retrieve the tax return for the fourth person. The system then determines whether the tax return for the fourth person indicates that the third person is a dependent of the fourth person. If so, the system extracts information about the fourth person from the tax return and uses the extracted information to populate one or more fields in the financial aid application.

In a variation on this embodiment, while retrieving the tax return for the person the system receives an identifier for the person and uses the identifier to retrieve the tax return for the person.

In a further variation, the tax return is retrieved from a government tax database.

In a further variation, the tax return is retrieved from a database for a tax preparation application.

In a further variation, the identifier is a Social Security Number.

In a variation on this embodiment, if the tax return does not contain sufficient information to populate all required fields of the financial aid application, the system allows a user to manually enter information into fields not populated by information from the tax return.

In a variation on this embodiment, the information contained in the tax return can include: a name; an address; a Social Security Number; and financial information associated with the person.

In a variation on this embodiment, the financial aid application is a Free Application for Federal Student Aid (FAFSA).

In a variation on this embodiment, the financial aid application is generated by a tax preparation application.

In a variation on this embodiment, the financial aid application is generated by a web based application.

One embodiment of the present invention provides a system that retrieves a tax return for a person for purposes of generating a financial aid application. During operation, the system receives a request to retrieve the tax return for the person from a requestor. Next, the system determines whether the person has authorized access to the tax return for purposes of generating a financial aid application. If so, the system retrieves the tax return for the person and transmits the tax return to the requestor.

In a variation on this embodiment, while determining whether the person has authorized access to the tax return, the system determines whether a field in the tax return indicates that the person has authorized the requestor to access the tax return for purposes of generating a financial aid application.

In a variation on this embodiment, while determining whether the person has authorized access to the tax return, the system queries a trusted source to determine whether the person has authorized the requestor to access the tax return for purposes of generating a financial aid application.

One embodiment of the present invention provides a system that verifies whether a first person is authorized to access a tax return for a second person. During operation, the system receives a request to determine whether the first person is authorized to access a tax return for purposes of generating a financial aid application. Next, the system determines whether the second person has indicated that the first person is authorized to access the tax return for purposes of generating a financial aid application. If so, the system authorizes the request to access the tax return.

In a variation on this embodiment, while determining whether the second person has indicated that the first person is authorized to access the tax return, the system determines whether a field in the tax return indicates that the second person has authorized the first person to access the tax return for purposes of generating a financial aid application.

In a variation on this embodiment, while determining whether the second person has indicated that the first person is authorized to access the tax return, the system queries a trusted source to determine whether the second person has authorized the first person to access the tax return for purposes of generating a financial aid application

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. This includes, but is not limited to, volatile memory, non-volatile memory, magnetic and optical storage devices such as disk drives, magnetic tape, CDs (compact discs), DVDs (digital versatile discs or digital video discs), or other media capable of storing computer readable media now known or later developed.

Computer System

Figure 1:
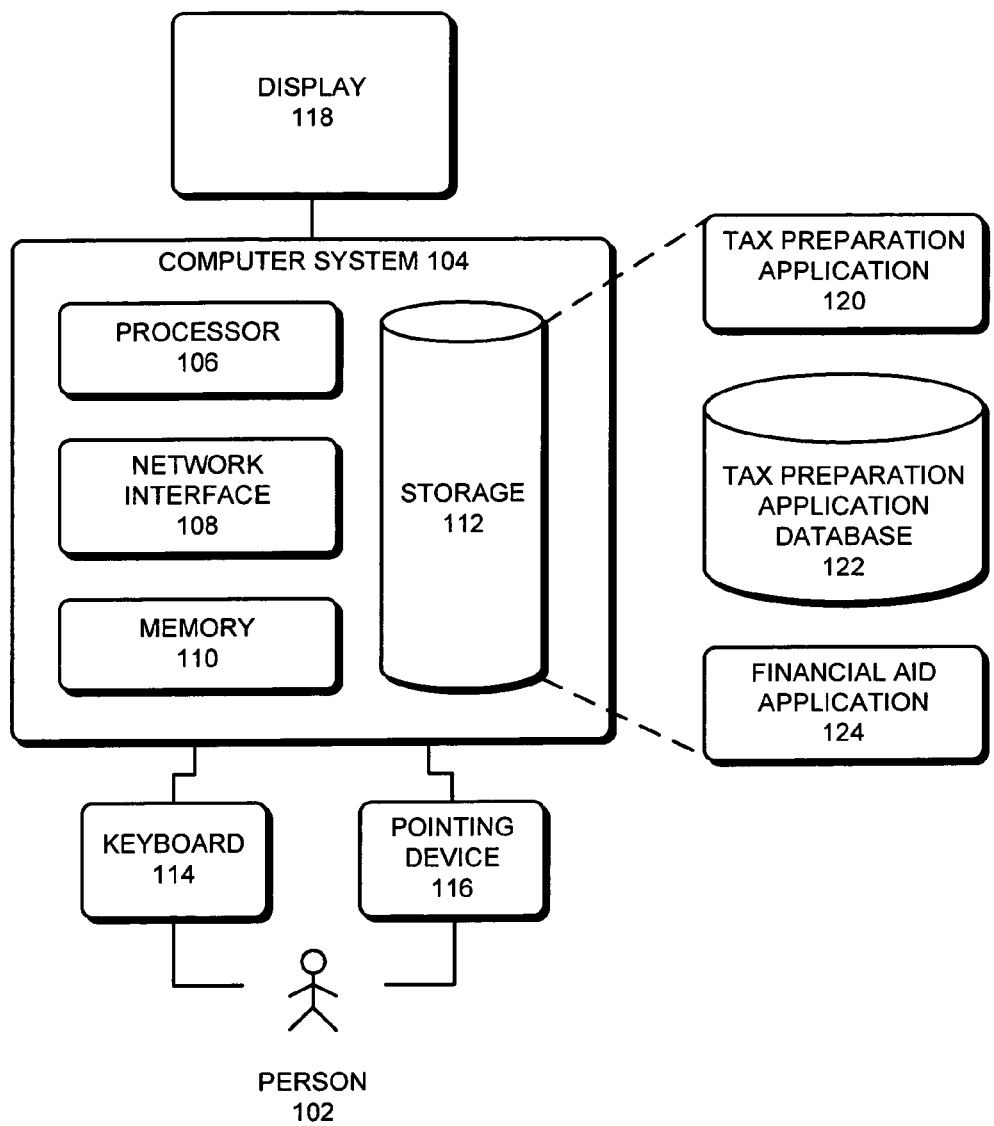
FIG. 1 presents a block diagram of a computer system in accordance with an embodiment of the present invention.

FIG. 1 presents a block diagram of a computer system 104 in accordance with an embodiment of the present invention. Computer system 104 includes processor 106, network interface 108, memory 110, and storage 112.

Processor 106 can generally include any type of processor, including, but not limited to, a microprocessor, a mainframe computer, a digital signal processor, a personal organizer, a device controller and a computational engine within an appliance. Network interface 108 can include any type of interface that provides connectivity between a computer system and a network, including, but not limited to, a wireless network interface, an Ethernet interface, and a phone network interface. Memory 110 can include any type of memory, including but not limited to, dynamic random access memory (DRAM), static random access memory (SRAM), flash memory, and read-only memory (ROM). Storage device 112 can include any type of non-volatile storage device that can be coupled to a computer system. This includes, but is not limited to, magnetic, optical, and magneto-optical storage devices, as well as storage devices based on flash memory and/or battery-backed up memory.

Person 102 interacts with computer system 104 by using keyboard 114, pointing device 116, and display 118. Keyboard 114 can include any device which facilitates entering in characters of the alphabet to computer system 104. Pointing device 116 can include, but is not limited to, a mouse, a trackball, a stylus pen, and a touchpad. Display 118 can include any device which can display the user interface of computer system 104, including, but not limited to, a cathode ray tube (CRT) display, a liquid crystal display (LCD), a television display, a plasma display, and a projector.

In one embodiment of the present invention, storage device 112 contains tax preparation application 120, tax preparation application database 122, and financial aid application 124.

In one embodiment of the present invention, tax preparation application 120 can include TurboTax® or Quicken®. Note that TurboTax and Quicken are trademarks and service marks of Intuit Inc., which are registered in the United States and other countries.

In one embodiment of the present invention, tax preparation application 120, tax preparation application database 122, and financial aid application 124 are located on storage devices which are separate from computer system 104. For example, the storage devices can be within another computer system or within a storage array network (SAN). Furthermore, tax preparation application 120, tax preparation application database 122, and financial aid application 124 can be located on different storage devices.

In one embodiment of the present invention, financial aid application 124 is a Free Application for Federal Student Aid (FAFSA).

Financial Aid Tool

One embodiment of the present invention provides a mechanism within a tax preparation application that generates a financial aid application from information contained within a tax return.

Another embodiment of the present invention provides a mechanism within a tax preparation application for a parent or guardian which automatically generates and files a financial aid application for a dependent. In this embodiment, information used to generate a tax return for the parent or guardian is imported into the financial aid application for the dependent.

In one embodiment of the present invention, if the dependent earns an income and has filed a tax return, the tax preparation application prompts the parent to provide information to identify a tax return for the dependent so that the information requested by the financial aid application can be extracted from the tax return for the dependent and can be imported into the financial aid application for the dependent.

In another embodiment of the present invention, the dependent uses the tax preparation application to file a financial aid application. In this embodiment, the tax preparation application asks the dependent to provide information to identify a tax return for a parent or guardian so that the information requested by the financial aid application can be extracted from the tax return for the parent or guardian.

In one embodiment of the present invention, if the dependent has not filed a tax return, the parent or guardian can manually provide the information about the dependent. In another embodiment of the present invention, if the dependent has not filed a tax return, the parent or guardian can be prompted by the tax preparation application to produce a new tax return for the dependent.

If the student is a financially-independent student, the information requested by the financial aid application is available in a tax return for the student. Hence, in one embodiment of the present invention, the student uses the financial aid tool to import information from the tax return for the student into the financial aid application.

In one embodiment of the present invention, the financial aid tool is a stand-alone application which is used to generate a financial aid application. In this embodiment, the stand-alone tool retrieves tax returns for the purpose of generating a financial aid application. In one embodiment of the present invention, the tax return is retrieved from a government tax database. In another embodiment, the tax return is retrieved from an intermediate tax processor which forwards tax returns to the government tax agency. In another embodiment of the present invention, the tax return is retrieved from a tax preparation application database.

After retrieving the tax return, the financial aid tool extracts information from the retrieved tax return for the purpose of generating the financial aid application.

In one embodiment of the present invention, information from a previously-filed financial aid application is imported into the tax preparation application for purposes of generating a tax return.

Generating a Financial Aid Application

Figure 2A:
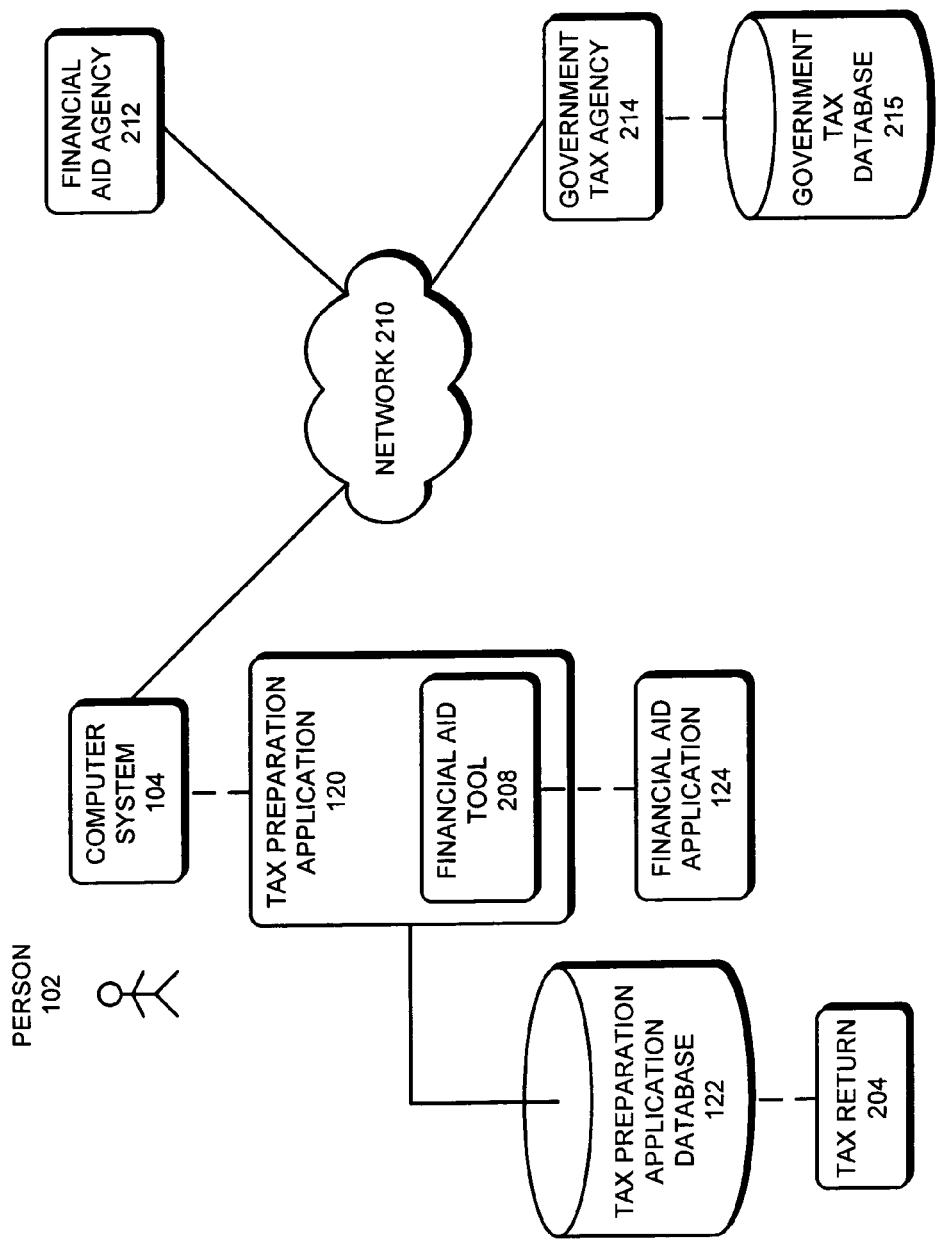
FIG. 2A presents a block diagram illustrating the process of generating a financial aid application in accordance with an embodiment of the present invention.

FIG. 2A presents a block diagram illustrating the process of generating a financial aid application 124 in accordance with an embodiment of the present invention. Referring to FIG. 2A, a person 102 uses tax preparation application 120 on computer system 104 to enter information about person 102 for the purpose of generating a tax return 204. Information about person 102 is stored in tax preparation application database 122 and is used by tax preparation application 120 to populate fields in a tax return template to generate tax return 204.

After completing tax return 204, tax preparation application 120 transmits tax return 204 to government tax agency 214 through network 210. Next, government tax agency 214 stores tax return 204 in government tax database 215. Note that tax return 204 can be first be transmitted to an intermediate tax return processor before being transmitted to government tax agency 214.

Network 210 can generally include any type of wired or wireless communication channel capable of coupling together computing nodes. This includes, but is not limited to, a local area network, a wide area network, or a combination of networks. In one embodiment of the present invention, network 210 includes the Internet.

In one embodiment of the present invention, information about person 102 can include, but is not limited to, a name, an address, a Social Security Number, and financial information associated with person 102.

In one embodiment of the present invention, tax preparation application 120 includes a financial aid tool 208 which uses information about person 102 stored in tax preparation application database 122 to populate one or more fields in financial aid application 124.

In one embodiment of the present invention, financial aid tool 208 uses information about person 102 from tax return 204, which has been submitted to government tax agency 214, to populate one or more fields in financial aid application 124.

In one embodiment of the present invention, after generating financial aid application 124, tax preparation application 120 transmits financial aid application 124 to financial aid agency 212 through network 210. In another embodiment of the present invention, financial aid application 124 is an online financial aid application. In this embodiment, financial aid tool 208 populates one or more fields in the online financial aid application.

Generating a Financial Aid Application for a Dependent

Figure 2B:
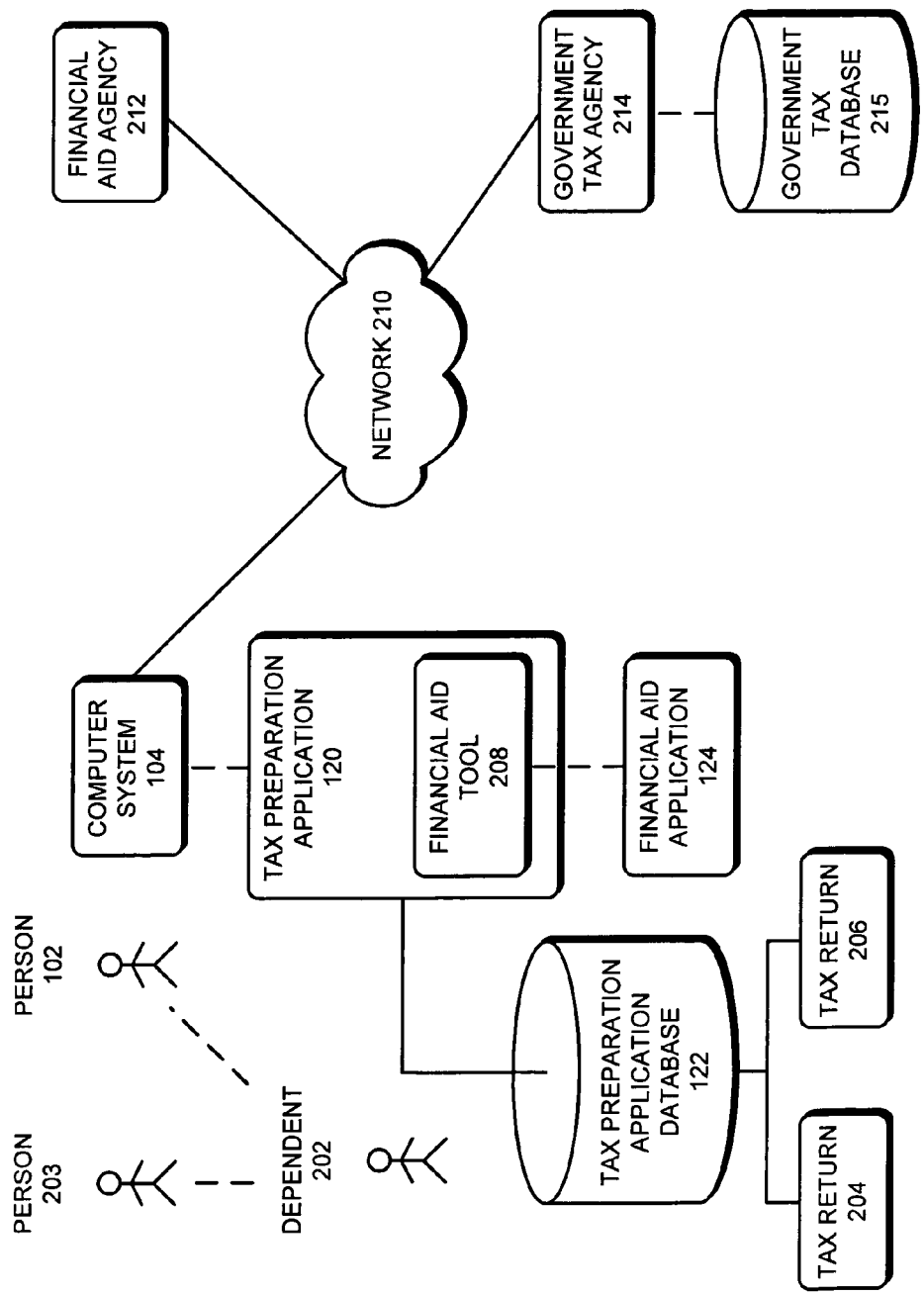
FIG. 2B presents a block diagram illustrating the process of generating a financial aid application for a dependent of a person in accordance with an embodiment of the present invention.

FIG. 2B presents a block diagram illustrating the process of generating a financial aid application 124 for a dependent 202 of person 102 in accordance with an embodiment of the present invention. The process illustrated in FIG. 2B is similar to FIG. 2A except that in FIG. 2B, person 102 generates financial aid application 124 for dependent 202. Hence, only the differences are discussed.

In one embodiment of the present invention, person 102 uses tax preparation application 120 on computer system 104 to enter information about dependent 202 for purposes of generating tax return 206. Next, information about dependent 202 is stored in tax preparation application database 122 and is used by tax preparation application 120 to populate fields in a tax return template to generate tax return 206.

After completing tax return 206, tax preparation application 120 transmits tax return 206 to government tax agency 214 through network 210. Next, government tax agency 214 stores tax return 206 in government tax database 215. Note that tax return 206 can be first be transmitted to an intermediate tax return processor before being transmitted to government tax agency 214.

If the financial aid applicant is a dependent of another person, information about the dependent as well as the parent or guardian is required when completing a financial aid application. Hence, in one embodiment of the present invention, financial aid tool 202 uses information about dependent 202 and person 102 which are stored in tax preparation application database 122 to populate one or more fields in financial aid application 124.

In one embodiment of the present invention, financial aid tool 208 uses information about dependent 202 from tax returns 204 and 206, which have been submitted to government tax agency 214, to populate one or more fields in financial aid application 124.

In one embodiment of the present invention, dependent 202 is claimed as a dependent by person 203. In this embodiment, information from a tax return for person 203 is used to populate one or more fields in financial aid application 124. In one embodiment of the present invention, tax return 204 is a joint tax return for person 102 and person 203. In another embodiment of the present invention, person 203 files a separate tax return using tax preparation application 120.

Generating a Financial Aid Application by a Dependent

Figure 2C:
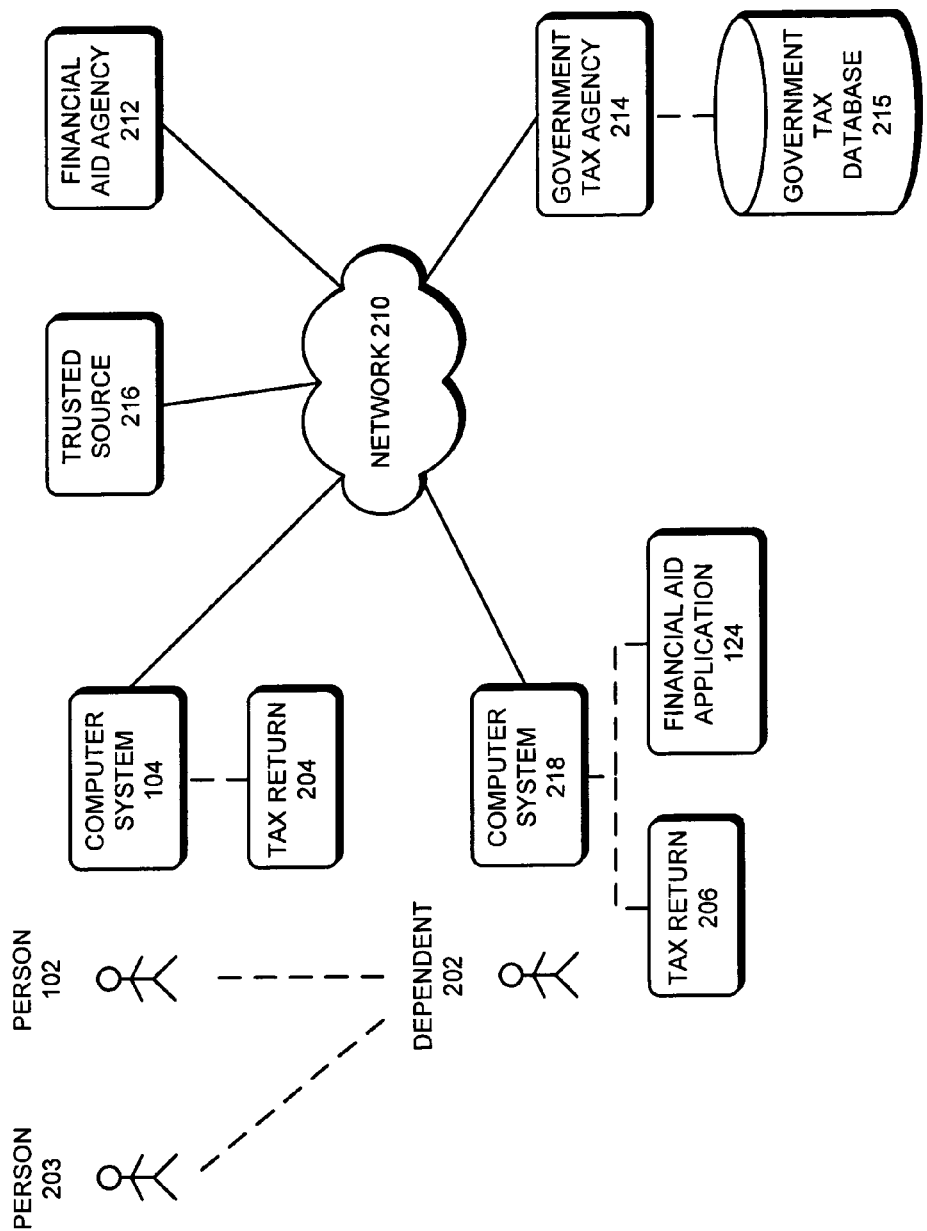
FIG. 2C presents a block diagram illustrating the process of generating a financial aid application by a dependent of a person in accordance with an embodiment of the present invention.

FIG. 2C presents a block diagram illustrating the process of generating a financial aid application 124 by a dependent 202, who is a dependent of a person 102, in accordance with an embodiment of the present invention. The process illustrated in FIG. 2C is similar to FIG. 2B except that in FIG. 2C, dependent 202 generates tax return 206 and financial aid application 124 on computer system 218. Hence, only the differences are discussed. In one embodiment of the present invention, computer system 218 includes the same components as computer system 104.

In one embodiment of the present invention, dependent 202 uses a tax preparation application on computer system 218 to enter information about dependent 202 for purposes of generating a tax return 206. Next, the information about dependent 202 is stored in a tax preparation application database and is then used by the tax preparation application to populate fields in a tax return template to generate tax return 206.

After completing tax return 206, the tax preparation application transmits tax return 206 to government tax agency 214 through network 210. Next, government tax agency 214 stores tax return 206 in government tax database 215. Note that tax return 206 can be first be transmitted to an intermediate tax return processor before being transmitted to government tax agency 214.

In order to populate the fields in financial aid application 124, information about person 102 and dependent 202 are required. Hence, in one embodiment of the present invention, the financial aid tool determines an identifier (e.g., Social Security Number) for a person who is claiming dependent 202 as a dependent from tax return 206. In this example, the financial aid tool on computer system 218 analyzes tax return 206 and determines that person 102 is claiming dependent 202 as a dependent.

One embodiment of the present invention uses the identifier for person 102 and the identifier for dependent 202 to request a tax return 204 for person 102 and a tax return 206 for dependent 202, respectively.

In one embodiment of the present invention, if the request is made to government tax agency 214, government tax agency 214 determines whether person 102 and dependent 202 have authorized access to tax returns 204 and 206, respectively, for the purpose of generating a financial aid application. In another embodiment of the present invention, if the request is made to an intermediate tax return processor, the intermediate tax return processor determines whether person 102 and dependent 202 have authorized access to tax returns 204 and 206, respectively, for the purpose of generating a financial aid application.

One embodiment of the present invention determines whether a field in tax return 204 indicates that person 102 has authorized access to tax return 204 for the purpose of generating a financial aid application. Another embodiment of the present invention determines whether a field in tax return 206 indicates that dependent 202 has authorized access to tax return 206 for the purpose of generating a financial aid application.

In one embodiment of the present invention, trusted source 216 is queried to determine whether person 102 has authorized access to information in a tax return belonging to person 102 for the purpose of generating a financial aid application. In another embodiment of the present invention, trusted source 216 is queried to determine whether dependent 202 has authorized access to information in a tax return belonging to dependent 202 for the purpose of generating a financial aid application.

In one embodiment of the present invention, the trusted source can include a government tax agency, a financial aid agency, a third party trusted source, and any other entity which is recognized as a trusted source by the financial aid agency associated with the financial aid application.

In one embodiment of the present invention, if person 102 has authorized access to information in a tax return belonging to person 102 for the purpose of generating a financial aid application, the financial aid tool retrieves a tax return for person 102. In a variation on this embodiment, the financial aid tool retrieves tax return 204 from government tax database 215. In another variation, the financial aid tool retrieves tax return 204 from an intermediate tax return processor, which processes tax returns for persons prior to transmitting the tax return to government tax agency 214.

In one embodiment of the present invention, if dependent 202 has authorized access to information in a tax return belonging to dependent 202 for the purpose of generating a financial aid application, the financial aid tool retrieves a tax return for dependent 202. In variation on this embodiment, the financial aid tool retrieves tax return 206 from government tax database 215. In another variation, the financial aid tool retrieves tax return 206 from an intermediate tax return processor.

In one embodiment of the present invention, a financial aid tool uses information about dependent 202 stored in a tax preparation application database to populate one or more fields in financial aid application 124. In another embodiment, the financial aid tool uses information about dependent 202 from tax return 206, which has been submitted to government tax agency 214 to populate one or more fields in financial aid application 124.

In one embodiment of the present invention, a financial aid tool uses information about person 102 from tax return 204, which has been submitted to government tax agency 214 to populate one or more fields in financial aid application 124.

In one embodiment of the present invention, dependent 202 is claimed as a dependent by person 203. In this embodiment, information from a tax return for person 203 is used to populate one or more fields in financial aid application 124. In one embodiment of the present invention, tax return 204 is a joint tax return for person 102 and person 203. In another embodiment of the present invention, person 203 files a separate tax return. In this embodiment, the process used to retrieve tax returns 204 and 206 can be used to retrieve the tax return for person 203.

In one embodiment of the present invention, instead of retrieving the entire tax return 204 and the entire tax return 206 from government tax database 215, the financial aid tool retrieves only the information about person 102 and dependent 202 that is required to generate financial aid application 124 from tax returns 204 and 206, respectively.

In one embodiment of the present invention financial aid application 124 is generated by a financial aid tool on a web server. In this embodiment, the applicant uses a web browser to access the financial aid tool on the web server. Note that the financial aid tool on the web server can operate in a similar way to financial aid tool embedded in a tax preparation application such as tax preparation application 120.

SUMMARY

Figure 3:
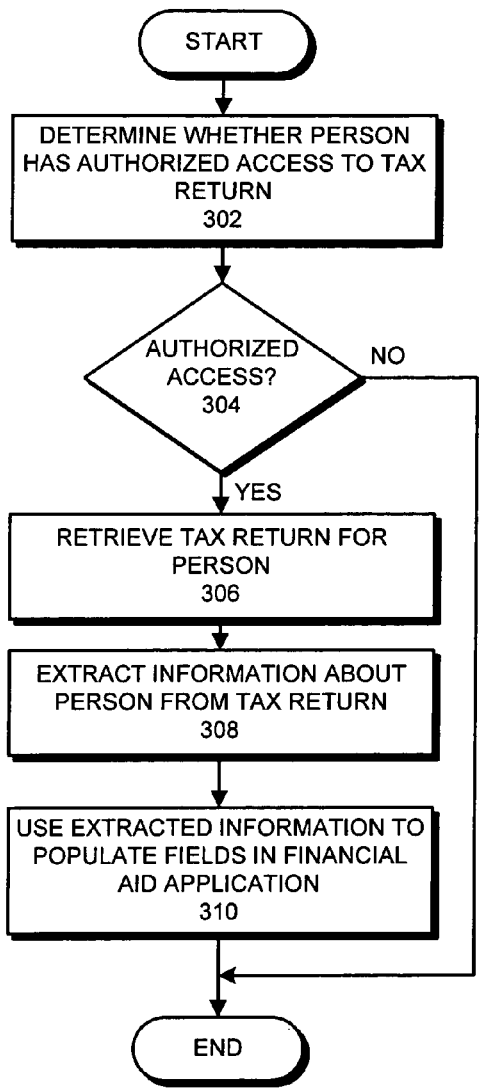
FIG. 3 presents a flow chart illustrating the process of generating a financial aid application in accordance with an embodiment of the present invention.

FIG. 3 presents a flow chart illustrating the process of generating a financial aid application in accordance with an embodiment of the present invention. The process begins when the system determines whether a person has authorized access to a tax return belonging to the person for purposes of generating a financial aid application (step 302). If so (step 304—yes), the system retrieves the tax return for the person (step 306). (Step 306 is described in more detail in reference to FIG. 4 below.) Next, the system extracts information about the person from the tax return (step 308). The system then uses the extracted information to populate one or more fields in the financial aid application (step 310).

In one embodiment of the present invention, the financial aid application is generated for the person.

In one embodiment of the present invention, while determining whether the person has authorized access to the tax return, the system determines whether a field in the tax return indicates that the person has authorized access to the tax return for purposes of generating a financial aid application.

In one embodiment of the present invention, while determining whether the person has authorized access to the tax return, the system queries a trusted source to determine whether the person has authorized access to the tax return for purposes of generating a financial aid application.

In one embodiment of the present invention, while determining whether the person has authorized access to the tax return, the system determines whether the person using the financial aid tool is the same as the person whose tax return is being requested.

In one embodiment of the present invention, the tax return is retrieved from a government tax database. In another embodiment of the present invention, the tax return is retrieved from a database for a tax preparation application.

In one embodiment of the present invention, if the tax return does not contain sufficient information to populate all required fields of the financial aid application, the system allows a user to manually enter information into fields not populated by information from the tax return.

Figure 4:
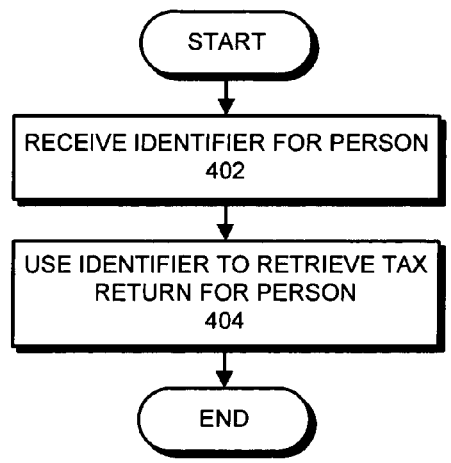
FIG. 4 presents a flow chart illustrating the process of retrieving a tax return in accordance with an embodiment of the present invention.

FIG. 4 presents a flow chart illustrating the process of retrieving a tax return in accordance with an embodiment of the present invention. During operation, the system receives an identifier for the person (step 402) and uses the identifier to retrieve the tax return for the person (step 404).

Figure 5:
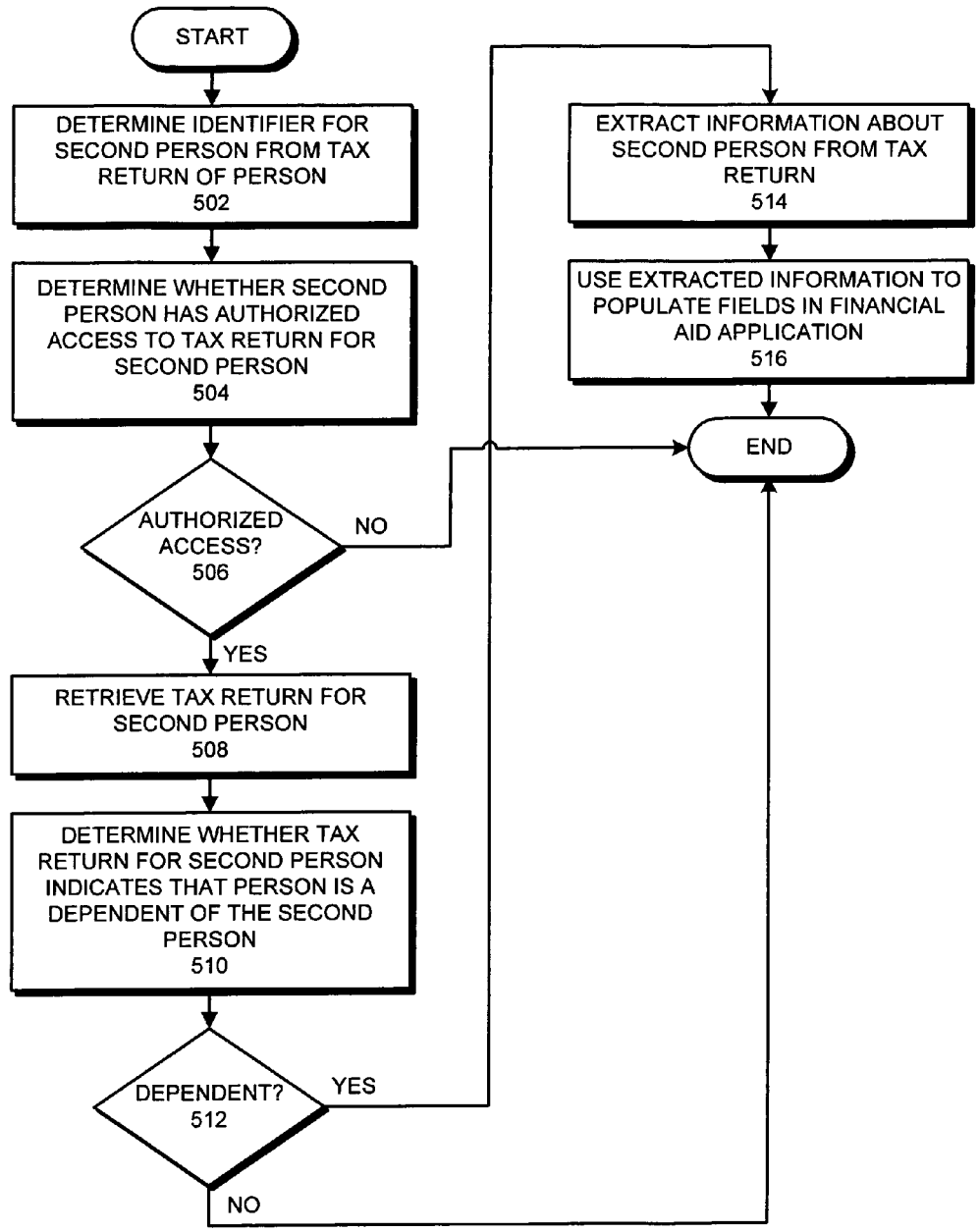
FIG. 5 presents a flow chart illustrating the process of generating a financial aid application by a dependent in accordance with an embodiment of the present invention.

FIG. 5 presents a flow chart illustrating the process of generating a financial aid application by a dependent in accordance with an embodiment of the present invention. During operation, the system determines an identifier for the second person from the tax return of the person (step 502). In one embodiment of the present invention, the identifier for the second person is provided by the person. Next, the system determines whether the second person has authorized access to a tax return belonging to the second person for purposes of generating a financial aid application for the person (step 504). If so (step 506—yes), the system uses the identifier to retrieve the tax return for the second person (step 508). Next, the system determines whether the tax return for the second person indicates that the person is a dependent of the second person (step 510). If so (step—yes), the system extracts information about the second person from the tax return (step 514). The system then uses the extracted information to populate one or more fields in the financial aid application (step 516).

Figure 6:
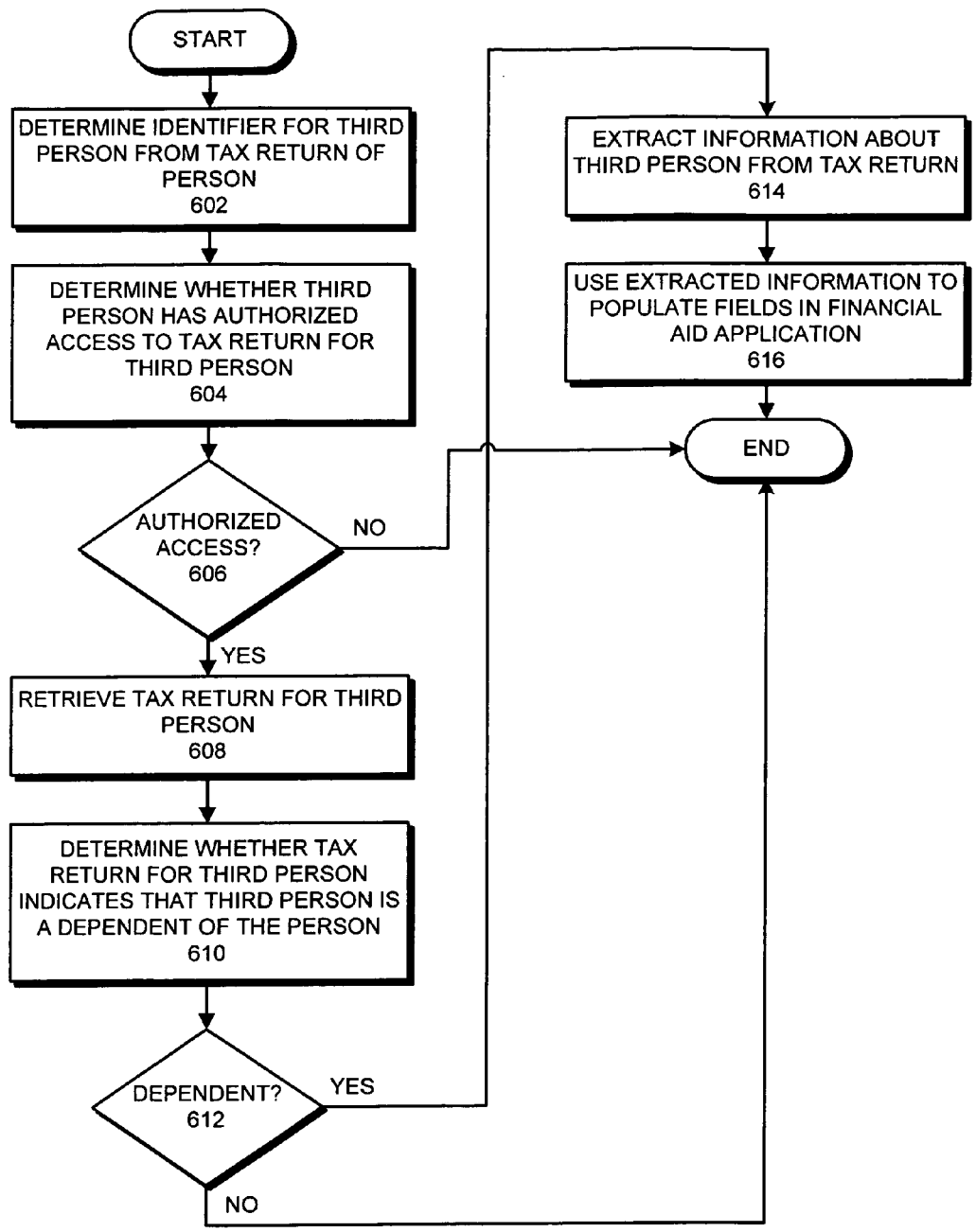
FIG. 6 presents flow chart illustrating the process of generating a financial aid application for a dependent in accordance with an embodiment of the present invention.

FIG. 6 presents flow chart illustrating the process of generating a financial aid application for a dependent in accordance with an embodiment of the present invention. During operation, the system determines an identifier for the third person from the tax return for the person (step 602). In one embodiment of the present invention, the identifier for the third person is provided by the person. Next, the system determines whether the third person has authorized access to a tax return belonging to the third person for purposes of generating a financial aid application for the third person (step 604). If so (step 606—yes), the system uses the identifier to retrieve the tax return for the third person (step 608). Next, the system determines whether the tax return for the third person indicates that the third person is a dependent of the person (step 610). If so (step 612—yes), the system extracts information about the third person from the tax return (step 614). The system then uses the extracted information to populate one or more fields in the financial aid application (step 616).

Figure 7:
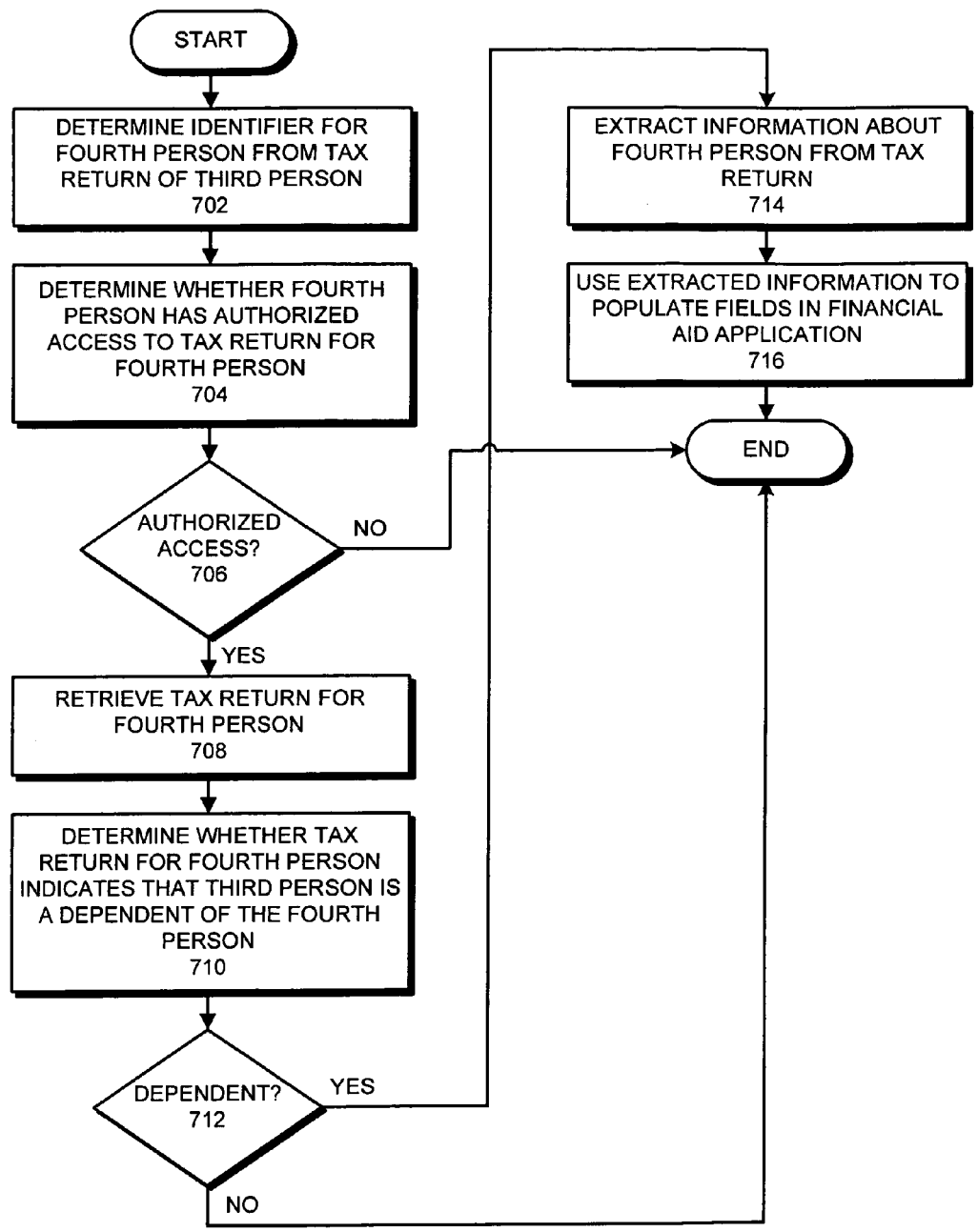
FIG. 7 presents flow chart illustrating the process of obtaining information about another parent or guardian of a dependent for purposes of generating a financial aid application for a dependent in accordance with an embodiment of the present invention.

If a fourth person claims the third person as a dependent, information about the fourth person is required to fill out the financial aid application. FIG. 7 presents flow chart illustrating the process of obtaining information about the fourth person for purposes of generating a financial aid application for a dependent in accordance with an embodiment of the present invention. During operation, the system determines an identifier for the fourth person from the tax return for the person (step 702). In one embodiment of the present invention, the identifier for the fourth person is provided by the person. Next, the system determines whether the fourth person has authorized access to a tax return belonging to the fourth person for purposes of generating a financial aid application for the third person (step 704). If so (step 706—yes), the system uses the identifier to retrieve the tax return for the fourth person (step 708). Next, the system determines whether the tax return for the fourth person indicates that the third person is a dependent of the fourth person (step 710). If so (step 712—yes), the system extracts information about the fourth person from the tax return (step 714). The system then uses the extracted information to populate one or more fields in the financial aid application (step 716).

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-implemented method that automatically populates tax return information into a financial aid application, comprising:
   requesting, via a computer, a tax return of a first person using a first identifier of the first person wherein said first person is a dependent financial aid applicant;
   determining, based on a field in the tax return of the first person, that access to the tax return of the first person has been authorized by the first person for the purpose of generating a financial aid application;
   based on said access to the tax return of the first person being authorized:
      retrieving, by the computer, the tax return of the first person from a database;
      extracting, by the computer, information about the first person from the retrieved tax return of the first person; and
      populating, by the computer, the extracted information about the first person into one or more fields of a financial aid application of the first person;
   determining, by the computer, a second identifier of a second person from the retrieved tax return of the first person;
   requesting, via the computer, a tax return of the second person using the determined second identifier;
   determining, based on a field in the tax return of the second person, that access to the tax return of the second person has been authorized by the second person for the purpose of generating a financial aid application;
   based on said access to the tax return of the second person being authorized:
      retrieving, by the computer, the tax return of the second person from the database;
   determining that the retrieved tax return of the second person indicates that the first person is a dependent of the second person;
   based on said indication:
      extracting, by the computer, information about the second person from the retrieved tax return of the second person; and
      populating, by the computer, the extracted information about the second person into further one or more fields of the financial aid application of the first person.

2. The method of claim 1, further comprising:
   generating for the first person the financial aid application of the first person.

3. The method of claim 1, wherein said determining, based on a field in the tax return of the second person, that access to the tax return of the second person has been authorized by the second person for the purpose of generating a financial aid application comprises determining that the field in the tax return of the second person indicates that the second person has authorized the first person to access the tax return of the second person for the purpose of generating the financial aid application.

4. The method of claim 1, wherein said determining, based on a field in the tax return of the second person, that access to the tax return of the second person has been authorized by the second person for the purpose of generating a financial aid application comprises querying a trusted source.

5. The method of claim 4, wherein the trusted source is one of:
   a government tax agency;
   a financial aid agency; and
   a third party trusted source.

6. The method of claim 1, wherein said retrieving the tax return of the first person and said retrieving the tax return of the second person respectively comprise:
   retrieving, by the computer, the tax return of the first person using the first identifier, and
   retrieving, by the computer, the tax return of the second person using the second identifier.

7. The method of claim 6, wherein the database is a government tax database.

8. The method of claim 6, wherein the database is a tax preparation application database.

9. The method of claim 6, wherein the first identifier is a Social Security Number associated with the first person and the second identifier is a Social Security Number associated with the second person.

10. The method of claim 1, further comprising:
    allowing the first person to manually enter information into fields not populated by the extracted information about the first person and the extracted information about the second person, if the tax return of the first person and the tax return of the second person do not contain information to populate all required fields of the financial aid application of the first person.

11. The method of claim 1, wherein the extracted information about the first person is one of: a name associated with the first person; an address associated with the first person; a Social Security Number associated with the first person; and financial information associated with the first person and the extracted information about the second person is one of: a name associated with the second person; an address associated with the second person; a Social Security Number associated with the second person; and financial information associated with the second person.

12. The method of claim 1, wherein the financial aid application of the first person is a Free Application for Federal Student Aid (FAFSA).

13. The method of claim 1, further comprising:
    generating, by the computer, the financial aid application of the first person.

14. The method of claim 1, wherein the computer is a web server and the method further comprises: generating, by the web server, the financial aid application of the first person.

15. A non-transitory computer-readable storage medium storing instructions that when executed by a computer cause the computer to:
    request, by the computer, a tax return of a first person using a first identifier of the first person wherein said first person is a dependent financial aid applicant;
    determine, based on a field in the tax return of the first person, that access to the tax return of the first person has been authorized by the first person for the purpose of generating a financial aid application;
    based on said access to the tax return of the first person being authorized:
       retrieve, by the computer, the tax return of the first person from a database;
       extract, by the computer, information about the first person from the retrieved tax return of the first person; and
       populate, by the computer, the extracted information about the first person into one or more fields of a financial aid application of the first person;

determine, by the computer, a second identifier of a second person from the retrieved tax return of the first person;

request, via the computer, a tax return of the second person using the determined second identifier;

determine, based on a field in the tax return of the second person, that access to the tax return of the second person has been authorized by the second person for the purpose of generating a financial aid application;

based on said access to the tax return of the second person being authorized:

retrieve, by the computer, the tax return of the second person from the database;

determine that the retrieved tax return of the second person indicates that the first person is a dependent of the second person;

based on said indication:

extract, by the computer information about the second person from the retrieved tax return of the second person; and populate, by the computer, the extracted information about the second person into further one or more fields of the financial aid application of the first person.

16. The non-transitory computer-readable storage medium of claim 15, further comprising instructions that when executed by the computer cause the computer to generate, for the first person the financial aid application of the first person.

17. The non-transitory computer-readable storage medium of claim 15, wherein said determining, based on a field in the tax return of the second person, that access to the tax return of the second person has been authorized by the second person for the purpose of generating a financial aid application comprises determining that the field in the tax return of the second person indicates that the second person has authorized the first person to access the tax return of the second person for the purpose of generating the financial aid application.

18. The non-transitory computer-readable storage medium of claim 15, wherein said determining, based on a field in the tax return of the second person, that access to the tax return of the second person has been authorized by the second person for the purpose of generating a financial aid application comprises querying a trusted source.

19. The non-transitory computer-readable storage medium of claim 18, wherein the trusted source is one of:
a government tax agency;
a financial aid agency; and
a third party trusted source.

20. The non-transitory computer-readable storage medium of claim 15, wherein said retrieving the tax return of the first person and said retrieving the tax return of the second person respectively comprise:
retrieving, by the computer, the tax return of the first person using the first identifier, and retrieving, by the computer the tax return of the second person using the second identifier.

21. The non-transitory computer-readable storage medium of claim 20, wherein the database is a government tax database.

22. The non-transitory computer-readable storage medium of claim 20, wherein the database is a tax preparation application database.

23. The non-transitory computer-readable storage medium of claim 20, wherein the first identifier is a Social Security Number associated with the first person and the second identifier is a Social Security Number associated with the second person.

24. The non-transitory computer-readable storage medium of claim 15, further comprising instructions that when executed by the computer cause the computer to:
allow the first person to manually enter information into fields not populated by the extracted information about the first person and the extracted information about the second person, if the tax return of the first person and the tax return of the second person do not contain information to populate all required fields of the financial aid application of the first person.

25. The non-transitory computer-readable storage medium of claim 15, wherein the extracted information about the first person is one of: a name associated with the first person; an address associated with the first person; a Social Security Number associated with the first person; and financial information associated with the first person and the extracted information about the second person is one of: a name associated with the second person; an address associated with the second person; a Social Security Number associated with the second person; and financial information associated with the second person.

26. The non-transitory computer-readable storage medium of claim 15, wherein the financial aid application of the first person is a Free Application for Federal Student Aid (FAFSA).

27. The non-transitory computer-readable storage medium of claim 15, further comprising instructions that when executed by the computer cause the computer to:
generate the financial aid application of the first person.

28. An apparatus that automatically populates tax return information into a financial aid application, comprising:
a memory;
a processor;
a financial aid tool configured to:
request a tax return of a first person using a first identifier of the first person wherein said first person is a dependent financial aid applicant;
determine, based on a field in the tax return of the first person, that access to the tax return of the first person has been authorized by the first person for the purpose of generating a financial aid application;
based on said access to the tax return of the first person being authorized:
retrieve the tax return of the first person from a database;
extract information about the first person from the retrieved tax return of the first person; and
populate the extracted information about the first person into one or more fields of a financial aid application of the first person;
determine a second identifier of a second person from the retrieved tax return of the first person;
request a tax return of the second person using the determined second identifier;
determine, based on a field in the tax return of the second person, that access to the tax return of the second person has been authorized by the second person for the purpose of generating a financial aid application;
based on said access to the tax return of the second person being authorized:
retrieve the tax return of the second person from the database;
determine that the retrieved tax return of the second person indicates that the first person is a dependent of the second person;
based on said indication:

extract information about the second person from the retrieved tax return of the second person; and
populate the extracted information about the second person into further one or more fields of the financial aid application of the first person.

* * * * *